Feb. 12, 1952 H. M. VEAUX 2,585,058

TELEPHONE RADIO LINK TERMINATION

Filed Oct. 14, 1948

INVENTOR
HENRI MAURICE VEAUX
BY R P Morris
ATTORNEY

UNITED STATES PATENT OFFICE 2,585,058

TELEPHONE RADIO LINK TERMINATION

Henri Maurice Veaux, Saint-Leu-la-Foret, France

Application October 14, 1948, Serial No. 54,394
In France October 28, 1947

6 Claims. (Cl. 250—9)

The present invention relates to terminal equipment for telephone networks. Such terminal equipment, in the case of commercial radiotelephony, provides for the alternate switching of the speed signal carried by a line wire from the subscriber to one or the other of the circuits leading towards the radio transmitter or receiver used for the transmission. This procedure utilizes certain arrangements described in my U. S. application, Serial No. 54,395, filed October 14, 1948, and offers inter alia the advantage of enabling the use of the alternative transmission in the same frequency band for one or the other direction of transmission.

The invention is illustrated in the accompanying drawings, in which

Figure 1:
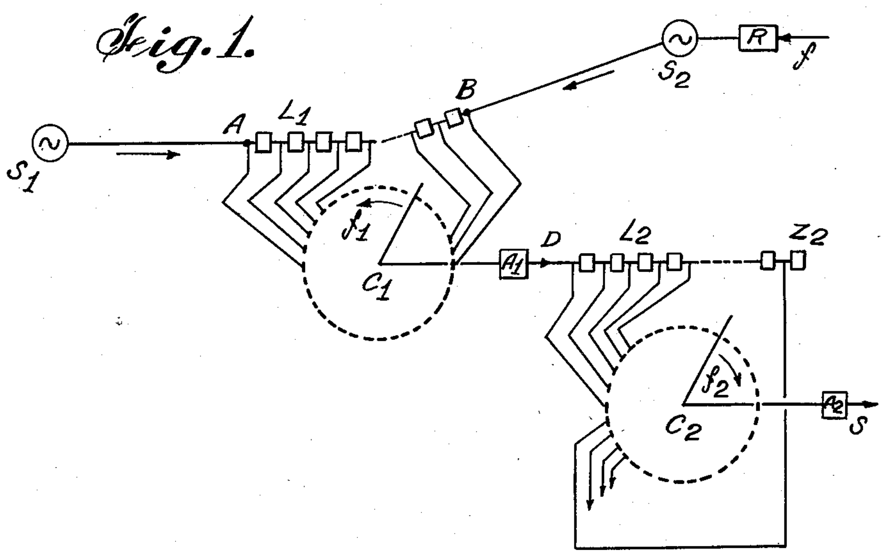
Fig. 1 is a diagrammatic representation of a telephone system embodying the invention.

The application of the invention to the telephone network shown in Fig. 1 is based on a fundamental feature constituting one of the objects of the above-mentioned patent application. $S_1$ is the subscriber at the origin of the line, $S_1A$ the lead-in to the point A of the network; $S_2$ represents a source of telephone currents delivered thereto by the receiver R which is energized by the waves emanating from the distant subscriber and shown by arrow $f$; line $S_2B$ is the lead-in to the point B of the network; a multi-tapped delay line $L_1$ is inserted between points A and B; various tappings, $n$ in number, are explored at the speed of rotation $N_1$ by switch $C_1$, and according to the principle described in the above-mentioned patent application, there is obtained at the output in D a current whose average component has a frequency the value of which depends upon the direction of propagation along line $S_1ABS_2$.

When subscriber $S_1$ talks, the current arriving at A and occupying a frequency band between the extreme values $n_1$ and $n_2$ is recorded in the delay line AB to be absorbed at the input of $S_2$ in a resistance equal to the characteristic resistance of the line. Each slice of signals recorded is followed by a quick scanning of the switch moving in the direction of arrow $f_1$, and there is obtained at the ouput D a current the average component of which corresponds to a frequency lying between two extreme values:

$$F_1=n_1(1+\theta N_1)$$
$$F_2=n_2(1+\theta N_1)$$

where $N_1$ is either positive or negative and $\theta$ represents the duration of the delay of the line. The signals thus picked up by discontinuous trains each correspond to a scanning of the line L representing a compression in time of the signals emanating from $S_1$, the conversion of duration corresponding to $(1+\theta N_1)$. The scanning by $C_1$ is made in a discontinuous fashion in synchronism with the displacement of the signals in $L_1$. One may imagine that the leading edge of each train in B starts a scanning of the line; one may also imagine a continuous movement of switch $C_1$ whose bank of contacts comprises an empty space for segregating the trains with a local restoration of phase between the movement of $C_1$ and that of the signals in line $L_1$. The signals picked up in D through a filter amplifier $A_1$ permit the passage of a band lying between the frequencies $n_1$ and $n_2$, and these signals may be subjected to a time conversion inversed through the set constituted by line $L_2$ terminated on its characteristic impedance $Z_2$ and associated with switch $C_2$ which gives at the output S a reproduction of the currents emanating from $S_1$ in accordance with the process described in the application referred to above. A synchronizing restoring device and a local phase restoring device between the movements of $C_1$ and $C_2$ simplifies the setting up of the system. The signal delivered in S will be used to modulate the transmitter.

When the distant subscriber talks, the telephone signals delivered in $S_2$ will produce signals through the set $L_1C_1$ occupying a frequency band outside the frequency band lying between the extreme values $F_1$ and $F_2$; the filter amplifier $A_1$ will not allow the transmission of these signals.

The following example, given purely as an indication without it being assumed to be a limitation of the field of application of the system, will clearly explain the principle of the system: let $\theta=10$ for the delay line $L_1$ for all frequencies below 3,000 c./s.; let us adopt a number of cells equal to 160, so that the number of scanning impulses will be sufficient for characterizing the nature of the signals. Let us choose the speed $N_1$ of scanning so that during one scanning operation the frequency of the component of the signals emanating from $S_2$ will be equal to zero; for this it is necessary that $N_1$ equal $1/\theta$ per second.

Under these conditions the frequency band of the signals emanating from $S_1$ lying between 250 and 3,000 c./s. gives signals at the output of $C_1$ the average component of which have a frequency limited between $(250\times 2)=500$ c./s. and $(3,000\times 2)=6,000$ c./s. The scanning of $C_1$ is made at the impulse frequency of 16,000, corresponding to a very acceptable quality of reproduction of the highest frequency of the spectrum.

Figure 2:
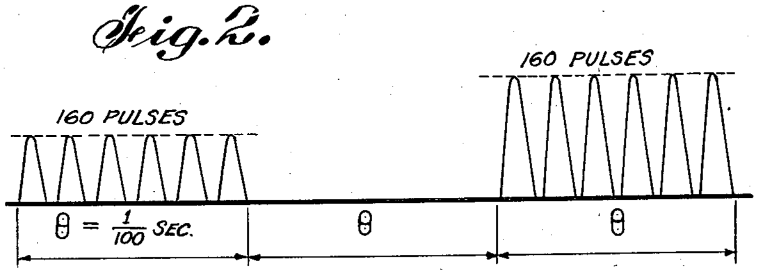
Fig. 2 is a diagram of pulses produced at the output of one of the scanning devices of the system.

It is to be noted that during one scanning operation the number of periods of the signals scanned is twice that of the number of periods stored at a given instant in the line because of the displacement in the direction of arrival. The 160 pulses from a scanning operation correspond to a slice of signals of a duration equal to $2\theta=20$ milliseconds, thus corresponding to a scanning of telephone signals the upper frequency limit of which is 3,000 at a rate of 8,000 pulses per second, which rate appears to be acceptable in the impulse multiplex transmission technique. During one scanning operation, the signals emanating from $S_2$ give a constant average component at the output of $C_1$. The corresponding resulting current at the output of $C_1$ is made up of trains of 160 pulses (Fig. 2) having the same variable amplitude from one train to the other; each train of duration set up is separated from the following by a duration equal to $\theta$. The average component thus corresponds to a modulation at a frequency of $2\theta=1/50$ seconds whose harmonics below the tens are stopped by the filter amplifier $A_1$. Besides, the remainder of parasitic oscillations reaching the transmitter while the subscriber $S_1$ listens can reach $S_1$ only with difficulty through the radio electric circuit used in the go and return directions, as it is attenuated again through the connection to the telephone network of the corresponding subscriber on the other side who is also in the state of communication. The filtering of the signal at the output of $C_1$ may be made in the high frequency side. The resulting signal currents emanating from $S_1$ and $S_2$ include the same carrier frequency equal to the frequency of the impulses, i. e. 16,000 in the example considered. The frequency band to be transmitted therefore lies respectively in the half bands lying between (16,000−6,000) to (16,000−500), on the one hand and (16,000+500) and (16,000+6,000) on the other hand.

Figure 3:
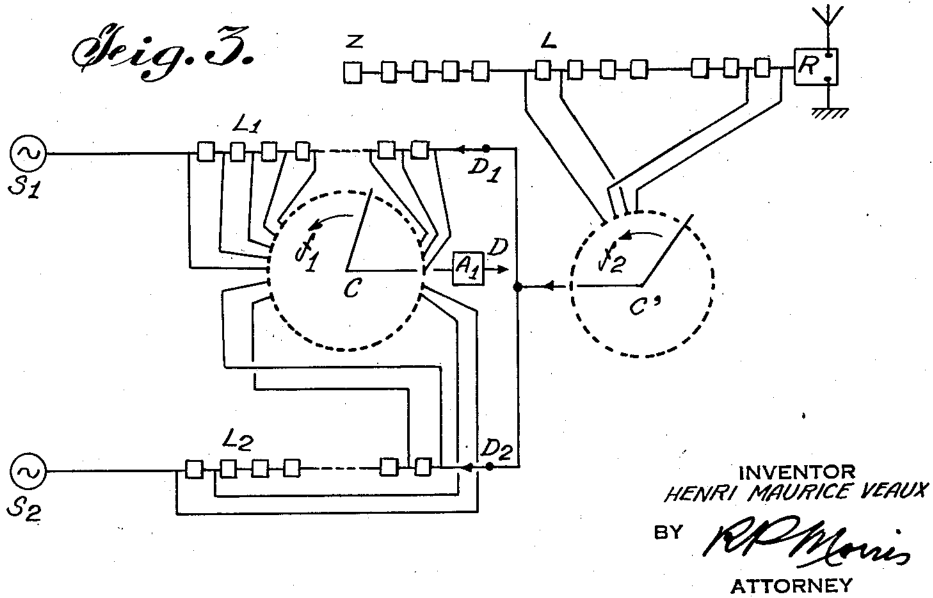
Fig. 3 is a diagrammatic representation of a modified form of the invention.

The invention involves the adaptation of the system of connection to the telephone network described above in the case of a multiple transmission with time distribution set up in accordance with the indication given in the patent application referred to above. The compressed signal picked up in D at the output of $C_1$ (Fig. 1) can be used directly in connection with a two-channel transmission in accordance with the schematic of Fig. 3. The transmitter shown in this figure comprises two delay lines $L_1$ and $L_2$ associated with a switch C and establishing a connection with the two subscribers $S_1$ and $S_2$. There is obtained in the output D compressed signals in the two connections which signals are used for modulating the transmitters. The receiver R is arranged in accordance with the indication given in the above-mentioned patent application and feeds signals into $D_1$ and $D_2$ intended for subscribers $S_1$ and $S_2$. The working of the arrangement does not require any complementary explanation.

Naturally the system may be applied in the case of more than two transmissions. It may be adapted without difficulty to the multiple transmission system with reduced frequency band, described particularly in French Patent No. 906,982, the corresponding United States application of which was filed July 11, 1947 and bears Serial No. 760,218. This application is now abandoned.

It may also be adapted to the system described in my application Serial No. 11,898, filed February 28, 1948, and now abandoned. For this it is sufficient to employ a delay line L (Fig. 3) comprising a sufficient number of cells to provide for a sufficient number of subscribers: the same slice of signal moving along over L is scanned several times by the switch C′ adjusted for a desirable time conversion. Moreover the invention comprises the use of the same carrier frequency and more generally of the same frequency band for communications alternatively in one or the other direction of transmission of a radio transmission system. It is known that this arrangement cannot be applied with ordinary terminal equipment for connection to the telephone network for the particular reason that self oscillations are set up for the lower frequencies owing to a feed-back towards the local transmitter of signals picked up by the local receiver. The present system avoids this reaction; on the contrary, signals emanating from subscriber $S_1$ come back towards this subscriber who hears same along the path $S_2BAS_1$, without shunting towards the transmitter, as mentioned above. To avoid this drawback several arrangements may be used. The subscriber hand-set $S_1$ may include a manual switch which enables the circuit of the receiver to be cut off instantaneously at will; or use may be made of the current picked up in D to block an amplifier positioned at B before incoming signals can reach the delay line $L_1$.

Since many changes could be made in the arrangement described above and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system for connecting a telephone circuit to a radio link, a subscriber's station, a radio receiver, a radio transmitter, a delay line connected between said subscriber's station and said receiver, a plurality of taps at spaced intervals on said delay line, a filter, switch means for repeatedly connecting said filter to said taps in sequence from the tap farthest removed from said subscriber's station to that nearest the said subscriber's station, whereby two groups of signals are produced at said filter having different frequencies, depending on the speed of operation of said switch means and the signal frequencies, said filter being designed to pass only the frequencies of the group of signals originating at the subscriber's station, and means for controlling said transmitter by the signals passed by said filter.

2. In a system for connecting a telephone circuit to a radio link, the combination, according to claim 1, in which means are provided connected to the output of the switch and responsive to signals emanating from the subscriber's station for blocking the receiver.

3. In a system for connecting a telephone circuit to a radio link, the combination, according to claim 1, in which there are a plurality of subscriber's stations, each with a tapped delay line, and the switch means sequentially connects the radio transmitter to the taps of the respective delay lines, whereby a multiplex system is provided.

4. In a system for connecting a telephone system to a radio link, the combination, according to claim 1, in which the means for controlling the transmitter by the signals passed by the filter includes a second delay line having a plurality of taps thereon connected to the output of the filter and a second switch means for sequentially connecting the transmitter to the taps on said second delay line at the same rate as said first switch means but in the reverse order, whereby the second switch compensates for the frequency conversion of the first switch.

5. In a system for connecting a telephone circuit to a radio link, the combination, according to claim 4 in which the first and second switch means are operated in synchronism.

6. In a system for connecting a telephone circuit to a radio link, the combination, according to claim 1, in which the rate of operation of the switch means is such as to substantially double the frequency of signals emanating from the subscriber station and received by the filter and reduce to zero the frequency of signals passing in the opposite direction through said delay line and delivered to said filter.

HENRI MAURICE VEAUX.

REFERENCES CITED

The following references are of record in the file of this patent:

UNITED STATES PATENTS

| Number | Name | Date |
|---|---|---|
| 2,172,354 | Blumlein | Sept. 12, 1939 |
| 2,186,742 | White | Jan. 9, 1940 |
| 2,275,224 | Henroteau | Mar. 3, 1942 |
| 2,367,277 | Henroteau | Jan. 16, 1945 |
| 2,414,265 | Lawson | Jan. 14, 1947 |